United States Patent [19]

Thompson et al.

[11] 4,045,512

[45] Aug. 30, 1977

[54] MELT BLENDING POLYAMIDE PROCESS

[75] Inventors: Robert M. Thompson; Stephen L. Nickol, both of Wilmington, Del.

[73] Assignee: Suntech, Inc., Wayne, Pa.

[21] Appl. No.: 745,320

[22] Filed: Nov. 26, 1976

[51] Int. Cl.$^2$ .......................................... C08L 77/00
[52] U.S. Cl. ..................... 260/857 TW; 260/78 R; 260/78 A
[58] Field of Search .................. 260/857 TW, 78 R

[56] References Cited

U.S. PATENT DOCUMENTS

| | | | |
|---|---|---|---|
| 2,577,621 | 12/1951 | May | 260/78 R |
| 3,397,107 | 8/1968 | Kimura | 161/173 |
| 3,499,853 | 3/1970 | Griebsch | 260/13 |
| 3,509,106 | 4/1970 | Lotz | 260/78 R |
| 3,549,724 | 12/1970 | Okazaki | 260/857 |
| 3,683,047 | 8/1972 | Honda | 260/857 TW |
| 3,729,449 | 4/1973 | Kimura | 260/78 R |
| 3,863,609 | 10/1974 | Kimura | 260/78 R |
| 3,882,090 | 6/1975 | Fagerburg | 260/78 R |

OTHER PUBLICATIONS

Formation of Mixed Polyamides During Melting of the Homochain Compounds; T. M. Frunze et al., High Molecular Weight Compounds (U.S.S.R.)1, 500-505, No. 4, Apr. (1959).

*Primary Examiner*—Paul Lieberman
*Attorney, Agent, or Firm*—J. Edward Hess; Donald R. Johnson; Anthony Potts, Jr.

[57] ABSTRACT

Improved melt blending process for preparing block copolymer of poly(4,7-dioxadecamethylene adipamide)-polycaprolactam, which is also known as N-30203-6//6, involves continuing the melt blending until the polymer is characterized in that the maximum amount of the block copolymer recovered from an aqueous formic acid solution containing the dissolved block copolymer exceeds about 90%. Fiber prepared from such a characterized block copolymer does not fuse when scoured in boiling water.

3 Claims, No Drawings

MELT BLENDING POLYAMIDE PROCESS

BACKGROUND OF THE INVENTION

1. Field of the Invention

The invention is directed to a process for melt blending a particular polyamide. The process involves an improvement to the melt blending of poly(4,7-dioxadacamethylene adipamide), hereinafter referred to as N-30203-6, and nylon-6 (also polycoprolactam), hereinafter referred to as N-6. The improved process results in a block copolymer, poly(4,7-dioxadecamethylene adipamide)-polycaprolactam, hereinafter referred to as N-30203-6//6, having enhanced properties.

2. Description of the Prior Art

The block copolymer N-30203-6//6 and method for preparing for it, are disclosed in R. M. Thompson's copending U.S. application Ser. No. 557,717, filed Mar. 12, 1975. One method of preparing N-30203-6//6 and other such copolymers is known as melt blending. The block copolymer has utility as a hydrophilic fiber. However, it can have a fusion problem described hereinafter.

To form a fabric from N-30203-6//6 the copolymer is spun into a fiber by known means. While spinning the fiber, a lubricating finish is applied to the fiber to facilitate subsequent processing steps. After the copolymer is spun, it is drawn and then annealed to stabilize the drawing. The resulting fiber is knitted into a tube and then, to wash off the finish applied earlier, it is placed in boiling water. During this washing off in the boiling water, which is also known as scouring, the copolymer fibers have a tendency to fuse together. This fusion causes the knitted fabric to become stiff which is unacceptable to a wearer.

SUMMARY

The aforementioned fusion problem can be overcome by an improvement to the process of melt blending N-30203-6 and N-6 to form a block copolymer. The improvement resides in the discovery that the melt blending should continue until the copolymer has certain fractional precipitation characteristics in formic acid. The characteristic is that the maximum amount of block copolymer recovered from an aqueous formic acid solution containing the dissolved block copolymer exceeds about 90.6 weight %. When the recovered block copolymer has the property of exceeding about 90.6 weight % via fractional precipitation a fiber prepared from it does not have a fusion problem while it still maintains its other desirable properties such as tensile and moisture absorption.

DESCRIPTION

In melt blending two different polyamides are mixed together and heated to a range between above their melting points but below their decomposition temperatures. The length of time the mixture is maintained within the aforementioned temperature range has a profound effect on the resulting structure. As the mixing at the elevated temperature begins the mass is a physical mixture of two different compounds. But gradually as the heating and mixing continues, the mixture is converted into a copolymer characterized as a "block" copolymer. However, if the heating and mixing continues, the length of the "blocks" decrease and sequences of "random" copolymers appear. If the heating and mixing occurs for a sufficient time, most of the "blocks" disappear and mostly "random" sequences form as evidenced by deterioration of its physical properties, including melting point. Use of a higher temperature within the aforementioned range reduces the time necessary to achieve the desired amount of amide interchange compared to the time required at a lower temperature. At present there is no known direct way of determining chain sequence of such a polymer. But indirect methods exist, and these are known to those skilled in the art. Controlled decomposition of such a copolymer will yield all identifiable components that make up the copolymer but will not indicate sequences.

One of the starting materials is N-30203-6. It can be prepared by the following scheme:

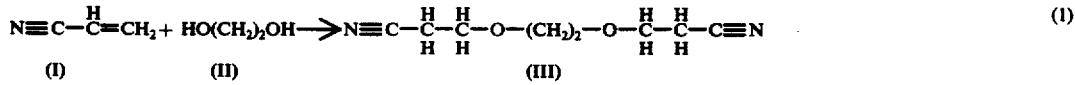

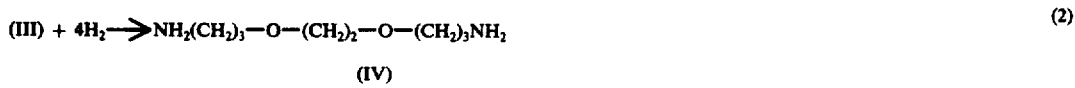

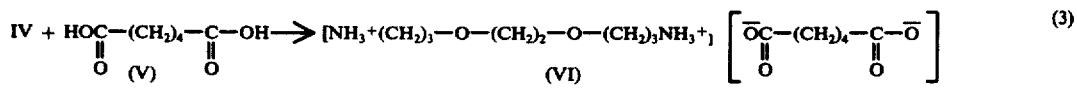

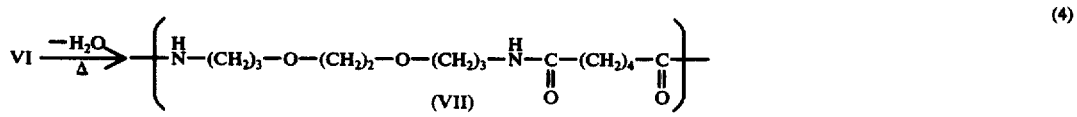

Aforementioned reaction 1 is often referred to as cyanoethylation; it is between acrylonitrile I and ethylene glycol, II, and results in 1,2-bis (β-cyanoethoxyethane) III. Reaction 2 is the hydrogenation of compound III to the diamine (i.e., 4,7-dioxadecamethylenediamine), IV. The diamine, IV, is reacted with adipic acid, V to form the salt VI in reaction 3. Then the salt VI is heated and upon removal of water forms the polymer VII.

The other starting material in N-6. It is available commercially and methods for preparing it are well known and abundantly disclosed in numerous publications.

Upon melt blending properly dried N-30203-6 and N-6, the resulting block copolymer, N-30203-6//6, has the following structural formula:

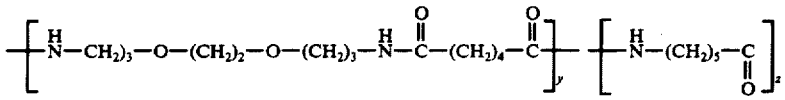

wherein y=4–200, z=4–200 and the molecular weight of the copolymer is within the range of about 5000–100,000.

The aforementioned N-30203-6//6 can contain as few as 4 repeating units. Thus the aforementioned y and z both can equal 4. Data reported in R. M. Thompson's aforementioned application shows that nylon-6 having four repeating units has an estimated melting point which does not differ substantially from the melting point of its relatively high molecular weight polymer. Similar data shows that N-30203-6 having four repeating units has a melting point which does not differ substantially from the melting point of its relatively high molecular weight polymer. Thus each four repeating unit block, when present in a block copolymer, can retain its own particular properties without substantially degrading the properties of the other repeating unit block. To minimize loss of properties the preferred minimum values for y and z are 8 and more preferred values are 10. Preferred maximum values of y and z are 175 and 185, respectively, more preferred values are 150 and 160 but values of 200 are operative.

The resulting block copolymer can also contain an antioxidant such as 1,3,5-trimethyl-2,6-tris-(3,5-ditertiary-butyl-4-hydroxybenzl benzene. Small amounts of antioxidant, e.g., 0.5 weight percent, are satisfactory, however, as little as 0.01 weight percent can be used or as much as 2.0 weight percent also can be satisfactory. Antioxidants other then the aforementioned one can be used. The antioxidant generally would be mixed in combination with the two polymers prior to melt blending. Other usual additives for polyamides such as delusterants and/or light stabilizers can also be incorporated.

The method used to determine the continuance or noncontinuance of the melt blending process involves the characterization of the polymer via fractional precipitation of the block copolymer in formic acid. U.S. Pat. No. 3,393,252 discloses the use of differences in solubility in formic acid to identify different polyamides. In fractional precipitation a sample of the block copolymer is completely dissolved in 90% formic acid. As the concentration of the formic acid is diluted by the addition of distilled water more and more of the block copolymer precipitates out. At some lower concentration of acid the amount of additional block copolymer precipitating out decreases as the dilution of the acid further increases. Still further at an even lower concentration the amount of block copolymer precipitating out approaches zero. This almost zero precipitating out occurs even though some of the block copolymer still remains dissolved in the diluted formic acid. It appears, based on the analytical techniques used, that the amount of precipitating block copolymer does in fact equal zero at some lower concentration of acid. In other words it is the maximum amount of dissolved polymer that can be recovered from the acid solution despite further dilution. Experimental details of this method are explained in the Examples.

One embodiment of the improvement to the process of melt-blending the aforementioned N-30203-6 and N-6 comprises continuing the melt blending until the block copolymer is characterized in that the maximum amount of the block copolymer recovered from an aqueous formic acid exceeds about 90.6 weight %. Another embodiment of the foregoing is that the melt-blending is continued until the block copolymer is characterized in that the formic acid concentration is less than about 50.7% at 50% recovery of the block copolymer dissolves in an aqueous formic acid solution containing the dissolved block copolymer. A preferred improvement is that the melt blending continues until the block copolymer is characterized in that the maximum amount of the block copolymer recovered from an aqueous formic acid exceeds about 90.6 weight % and, in addition, the formic acid concentration is less than about 50.7% at 50% recovery of the block copolymer dissolved in an aqueous formic acid solution containing the dissolved block copolymer.

The following examples describe how the block polyamide copolymer was prepared using present improvement. Also reported are results of comparative block polyamide copolymer which was prepared not using the improvement.

EXAMPLES

1. Preparation of 1,2-bis($\beta$-cyanoethoxyethane) (NC—$(CH_2)_2$O—$(CH_2)_2$—O—$(CH_2)_2$-CN)

To a 5 liter double walled (for water cooling) glass reactor with a bottom drain and stopcock were charged 930 grams (15 moles) of ethylene glycol and 45.6 grams of 40% aqueous KOH solution. Some 1620 grams (30.6 moles) of acrylonitrile (N≡C-CH=$CH_2$) were then added dripwise with stirring at such a rate that the temperature was kept below 35° C. After the addition was completed the mixture was stirred an additional hour and then allowed to stand overnight. The mixture was then neutralized to a pH of 7 by the addition of 6 molar HCl. After washing with saturated NaCl solution three times, the product was separated from the aqueous layer, dried over $CaCl_2$ and passed through an $Al_2O_2$ column to insure that all basic materials had been removed. The yield obtained was 90% of theoretical.

2. Preparation of 4,7-dioxadecamethylenediamine ($NH_2(CH_2)_3$—O—$(CH_2)_2$—O—$(CH_2)_3$—$NH_2$)

In an 800 milliliter hydrogenation reactor were charged 150 grams of 1,2-bis($\beta$-cyanoethoxyethane), 230 milliliters of dioxane and about 50 grams Raney Co. After purging the air, the reactor was pressurized with hydrogen up to 2000 psi and heated to 110° C. As the hydrogen was consumed additional hydrogen was added until pressure remained constant. Upon cooling, the pressure was released and the catalyst was filtered. The dioxane was removed by atmospheric distillation. The remaining mixture was distilled by a 3 foot spinning band distillation unit. The diamine distilled at 130°–124° C and 3.75 mm Hg. About 98 grams of 99.95% pure material were obtained. The material can be referred to as 303203 diamine.

3. Preparation and Polymerization of Poly (4,7-dioxadecamethylene adipamide) (30203-6)

To a solution of 41.50 grams of adipic acid dissolved in a mixture of 250 milliliters of isopropanol and 50 milliliters of ethanol were added, with stirring, 50 grams of the 30203 diamine dissolved in 200 milliliters of isopropanol. An exothermic reaction occurred. Upon cooling, a polymer salt crystallized out of solution. The salt was collected on a Buchner funnel and subsequently recrystallized from a mixture of 400 milliliters of ethanol and 300 milliliters of isopropanol solution. The product, dried in vacuo overnight at 60° C, had a melting point of 128° C and the pH of a 1% solution was 6.9 and 85 grams (82% yield of theoretical) of the salt was obtained.

About 40 grams of the polymer salt were charged to a heavy walled glass polymer "D" tube. Then the neck of the tube was constricted for sealing and purges of air by evacuating and filling with nitrogen 5 times. Finally the tube was heated in an aluminum block for 2 hours at 200° C. After cooling the tip of the tube was broken off and the remaining portion was bent over at a 45° angle by heating and then connected to a manifold and purged of air with nitrogen vacuum cycles. The tubes were heated at 222° C under nitrogen at atmospheric pressure for 6 hours using methylsalicylate vapor baths. On cooling, the tubes were broken and the polymer plug crushed to ⅛ inch size pieces.

4. Polymer Melt Blending

Two different methods were used to melt blend the polyamides. Four of the samples, i.e., numbers 1 to 4, were made by feeding the dried polymers, i.e. N-30202-6 and N-6 to an extruder. The extruder melted the polymer and fed it to a static mixer where the block copolymer were formed as a result of the mixing and heating at an elevated temperature. The accompanying Table lists the time in the mixer and the temperature used. The two other samples, i.e., numbers 5 and 6, were made by charging suitable amounts of dried 30203-6 polymer and nylon-6 to a container having two openings in the rubber stopper. The openings were for a helical stirrer and a nitrogen inlet. The container was purged of air. Afterwards the nitrogen-filled container was heated using a suitable liquid-vapor bath. The mixture of the two polymers was agitated with the helical stirrer powered by an air motor for the required time. Before allowing the molten polymer to cool the stirrer was lifted to drain the polymer. In both methods after solidification the resulting copolymers were broken up and dried for spinning.

5. Polymer Spinning and Drawing

After the aforementioned melt blending the various N-30203-6//6 were spun into a fiber using a ram-extruder. The samples were spun through a spinneret having 7 orifices 12 mils in diameter and 24 mils in length. The dried samples, about 50 grams, were changed to the extruder and allowed 25 minutes to melt and reach an equilibrium temperature i.e. about 230° C. Then the samples were forced through screen filters, 40 mesh and 250-mesh stainless steel screens and the spinneret by a motor-driven ram. The samples of N-30203-6//6 were melt spun at a suitable feed rate. The yarns passed from the spinneret through guides and were collected on paper tubes at a take-up speed of 138 ft./min. A spin finish, which is commercially available and which had been dissolved in heptane, was applied to the yarn as it passed over an applicator. The applicator was a nylon felt saturated with the spin finish and was attached to the yarn guide located about 4 feet below the spinneret. During the spinning the block temperature of the extruder was about 225° C while the ram pressure was about 400 psig.

6. Testing for Fiber Fusion

The resulting fibers, i.e. samples 1–6 were then knitted into tubes and then placed in boiling water. After the knitted tubes were removed from the boiling water the tubes were deknitted to determine the relative amounts of fiber fusion. The results are reported in the Table. Even where the amount of fusion is labeled small, the amount was sufficient to make it unacceptable as a commercial fabric.

7. Characterization of the Block Copolymer

Portions of the samples 1 to 6 were tested as to their fractional precipitation in formic acid. Generally the mthod was as follows: One gram of dry copolymer, i.e., N-30203-6//6, was weighed to the nearest tenth of a milligram. The one gram sample was dissolved in a standardized formic acid (i.e., 90% formic acid). The resulting solution was diluted with distilled water to a given % formic acid, e.g., 55%. The solution was allowed to stand at ambient temperature for three hours and then filtered. The collected precipitate was then washed with water, dried and weighed to give the % sample recovered at that particular formic acid concentration. A graph was then constructed by plotting the % of the sample recovered at the various formic acid concentrations. Each of the samples had different solubilities in formic acid. With the described graph the formic acid concentration at 50% recovery of the dissolved polymer was estimated. These values are also reported in the Table.

The Table presents the results of the various samples tested. The results are the concentration of formic acid when 50% of the dissolved copolymer was recovered and the maximum amount of dissolved copolymer that was recovered. Also presented for each sample is the blending time, the temperature at which the blending took place, the amount of filament fusion observed for knitted fabric prepared from each of the copolymers.

As can be seen from the Table as the formic acid concentration at 50% copolymer recovery decreases e.g. from 54.8 to 54.3%, the amount of filament fusion decreases. And when the formic acid concentration decreased to 50.7% no filament fusion is observed. Thus it can be concluded that if the formic acid at 50% copolymer recovery is less than 50.7% no filament fusion exists. In an equal manner it can be observed that once the maximum amount of copolymer recovered exceeds 90.6% no further filament fusion is observed. It can also be concluded that if the maximum amount of copolymer recovered from the formic acid solution exceeds 90.6% no filament fusion exists. Another conclusion is that when both characterizations exist no filament fusion exists.

Analogous results will be obtained when blodk copolymers of N-30203-6//6 are prepared from other ratios of N-30203-6 and N-6 then those reported heretofore.

TABLE

Elimination of Filament Fusion by Control of Formic Acid Solubility

TABLE

Elimination of Filament Fusion by Control of Formic Acid Solubility

| Sample (a) | Blend Time | Temperature °C | Amount of Filament Fusion | Formic Acid Concentr. at 50% Recovery | Maximum % of Sample Recovery |
|---|---|---|---|---|---|
| 1 | 9 | 260 | Large | 54.8 | 80.4 |
| 2 | 10 | 260 | Large | 54.6 | 78.8 |
| 3 | 26 | 260 | Moderate | 52.5 | 84.2 |
| 4 | 26 | 282 | Small | 54.3 | 90.6 |
| 5 | 45 | 282 | None | 50.7 | 94.7 |
| 6 | 75 | 282 | None | 47.3 | 93.8 |

(a) Each sample consists of 30wt % of N-30203-6 and 70% of N-6.

The invention claimed is:

1. In the process of melt-blending poly(4,7-dioxadecamethylene adipamide) and polycaprolactam wherein the improvement comprises continuing the melt blending until the clock copolymer is characterized in that the maximum amount of block copolymer recovered from an aqueous formic acid solution containing the dissolved block copolymer exceeds about 90.6 weight %.

2. In the process of melt-blending poly(4,7-dioxadecamethylene adipamide) and polycaprolactam wherein the improvement comprises continuing the melt blending until the block copolymer is characterized in that the formic acid concentration is less than about 52.5% at 50% recovery of the block copolymer dissolved in an aqueous formic acid solution containing the dissolved block copolymer.

3. The improvement according to claim 2 wherein in addition the block copolymer is characterized in that the maximum amount of the block copolymer recovered from an aqueous formic acid solution containing the block copolymer exceeds 90.6 weight %.

* * * * *